United States Patent
Funaki et al.

(10) Patent No.: US 8,213,776 B2
(45) Date of Patent: Jul. 3, 2012

(54) SELECTING DEVICE, SELECTING METHOD, AND SELECTING PROGRAM STORAGE MEDIUM

(75) Inventors: Isao Funaki, Kawasaki (JP); Aki Kita, Kawasaki (JP); Eiichi Matsuzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1346 days.

(21) Appl. No.: 11/483,985

(22) Filed: Jul. 11, 2006

(65) Prior Publication Data
US 2007/0206918 A1      Sep. 6, 2007

(30) Foreign Application Priority Data

Mar. 1, 2006   (JP) ................. 2006-055261

(51) Int. Cl.
| | |
|---|---|
| H04N 5/76 | (2006.01) |
| H04N 5/78 | (2006.01) |
| H04N 5/84 | (2006.01) |
| H04N 5/783 | (2006.01) |
| G06F 3/00 | (2006.01) |
| G06F 3/048 | (2006.01) |
| G06F 17/00 | (2006.01) |
| G06F 17/27 | (2006.01) |

(52) U.S. Cl. ........ 386/293; 386/314; 386/334; 386/350; 704/9; 715/209; 715/712; 715/713; 715/764; 715/765; 715/767; 715/798; 715/838; 715/848; 715/851

(58) Field of Classification Search .............. 386/83, 386/68, 81, 82, E5.001; 348/E5.007, E7.061; 715/764, 765, 848, 209, 712, 713, 767, 798, 715/838, 851; 704/9; 707/999.002, E17.01, 707/E17.026, E17.058, E17.08, E17.142; G9B/19.014, 19.015, 27.019, 27.047, 27.051
See application file for complete search history.

(56) References Cited

U.S. PATENT DOCUMENTS

| | | | | |
|---|---|---|---|---|
| 5,619,709 | A * | 4/1997 | Caid et al. ............. | 715/209 |
| 7,428,710 | B2 * | 9/2008 | Robbins ............... | 715/848 |
| 2003/0149982 | A1 | 8/2003 | Nakashima et al. | |
| 2004/0028379 | A1 * | 2/2004 | Ozaki ................... | 386/68 |
| 2005/0289482 | A1 * | 12/2005 | Anthony et al. ...... | 715/851 |

FOREIGN PATENT DOCUMENTS

| | | |
|---|---|---|
| EP | 0889647 | 1/1999 |
| JP | 11-25541 | 1/1999 |

(Continued)

OTHER PUBLICATIONS

Chinese Office Action issued on Mar. 6, 2009 in corresponding Chinese Patent Application 200610111038.1.

(Continued)

*Primary Examiner* — Thai Tran
*Assistant Examiner* — Syed Hasan
(74) *Attorney, Agent, or Firm* — Fujitsu Patent Center

(57) ABSTRACT

Disclosed are a selecting device, a selecting method, and a selecting program storage medium, which are configured to surely and easily select programs such as a drama series, even when a large number of programs are recorded. The selecting device includes: a designating section which designates a program from programs stored in a storage device in response to an operation; a searching section which searches the programs stored in the storage device for a program satisfying a predetermined correlation between itself and the program designated by the designating section; and a selecting section which collectively selects the program designated by the designating section and the program searched out by the searching section collectively.

12 Claims, 12 Drawing Sheets

| | FOREIGN PATENT DOCUMENTS | | |
|---|---|---|---|
| JP | 3267249 | 1/2002 | |
| JP | 2002-84469 | 3/2002 | |
| JP | 2002084469 A * | 3/2002 | |
| JP | 3340342 | 8/2002 | |
| JP | 2003-224791 | 8/2003 | |
| JP | 2003-230067 | 8/2003 | |
| JP | 2005-39567 | 2/2005 | |
| JP | 2005-244426 | 9/2005 | |
| JP | 2006-048857 | 2/2006 | |

OTHER PUBLICATIONS

Japanese Office Action dated Jan. 19, 2010 and issued in corresponding Japanese Patent Application 2006-055261.
Office Action issued in corresponding Korean Patent Application No. 10-2006-0073565, on Sep. 14, 2007.

* cited by examiner

SELECTING DEVICE, SELECTING METHOD, AND SELECTING PROGRAM STORAGE MEDIUM

BACKGROUND OF THE INVENTION

1. Field of the Invention

The present invention relates to a selecting device, a selecting method, and a selecting program storage medium which are configured to select at least one program out of recorded programs.

2. Description of the Related Art

In recent years, it has become a common practice that antennas and television tuners for receiving television waves are incorporated in personal computers. Accordingly, it is becoming a common practice today to view television programs, or to record distributed television programs, by use of a personal computer. In addition, it is also put into practice that programs dedicated to personal computers are distributed through the Internet free of charge. As a result, it is anticipated that there is an increase in the number of users utilizing personal computers instead of television sets or video cassette recorders.

Incidentally, since a personal computer includes a large-capacity hard disk device, it is possible to record numerous programs without regard to the remaining capacity. Moreover, unlike a video cassette recorder with a videotape, it is possible to store the recorded programs without using a large space. In addition, it is easier to copy the recorded programs to digital versatile disks (DVDs) and the like, and to delete unnecessary programs. Accordingly, there are many users who record whatever programs, which they are interested in, for the time being, in their personal computers. As a consequence, in some cases, a number of unviewed programs may be stored in hard disk devices in those personal computers. A list of recorded programs is usually displayed when the recorded programs are browsed and dubbed, so that a desired program is selected from the list. However, it is difficult to select a desired program from the recorded programs, when a large number of unviewed programs are recorded and the list simply displays titles of the programs and distribution dates and times thereof.

Concerning this problem, the Official Gazette of Japanese Patent Applications Nos. H-11(1999)-25541, 2002-84469, and H 10(1998)-243309 disclose techniques designed to display a list of programs in which titles of programs scheduled to be distributed are arranged in a three-dimensional space formed by axes representing a time, a day of the week, a week, and the like. Although these techniques are originally intended to display the list of programs scheduled to be distributed, it is possible to use the techniques to display a list of recorded programs, and thereby, to quickly recognize the distribution date and time of those programs. Moreover, by arranging the titles of the programs in the three-dimensional space formed by the axes representing the time, the day of the week, and the week, it is possible to arrange the titles of the programs in the same line in the case of a drama series to be continuously distributed on the same day every week and at the same time. When a user wishes to view the drama series continuously, for example, the user can select the series of programs easily.

Nevertheless, for example, an episode of the drama series or the like may be distributed at a date and time different from the date and time when the episode is scheduled to be distributed on a day when a baseball game is broadcast live on the same channel, because hours for which the baseball game is broadcast live are prolonged. Moreover, the distribution date and time may be different for a first or final episode of the drama series. As a result, there may be a case when the programs of the drama series are not arranged on the same line in the list even by use of the techniques disclosed in the above described Japanese Patent Applications. In this case, there is a risk of failure to select several of the recorded programs of the drama series. In addition, there is also a problem that it is troublesome to select the recorded programs of the same drama series one-by-one from the displayed list. Recently, a storage capacity of a small-sized storage medium is rapidly increasing. Therefore, consideration has been made for dubbing and saving all the programs of the drama series in a single storage medium. Accordingly, there is a demand that the leaving out of a program from a series of programs as mentioned above be surely avoided.

SUMMARY OF THE INVENTION

The present invention has been made in view of the above circumstances and provides a selecting device, a selecting method, and a selecting program storage medium, which are capable of surely and easily selecting programs of a drama series and the like, even when a large number of programs are recorded.

A selecting device according to an aspect of the present invention includes: a designating section which designates a program from programs stored in a storage device in response to an operation; a searching section which searches the programs stored in the storage device for a program satisfying a predetermined correlation between itself and the program designated by the designating section; and a selecting section which collectively selects the program designated by the designating section and the program searched out by the searching section.

According to the selecting device of the present invention, when a program is selected from the programs stored in the storage device, a program which satisfies a predetermined correlation between itself and the selected program is searched for. Then, the searched-out program is automatically and collectively selected. Therefore, even in the case where a large number of programs are recorded, a user can surely and easily select programs of a drama series and the like by selecting only one program of the drama series.

In addition, in the selecting device of the present invention, it is preferable that the storage device stores each program in association with a distribution time zone when the program is distributed, and that the searching section searches for a program which is distributed in a distribution time zone overlapping the distribution time zone when the program designated by the designating section is distributed.

A series of programs such as a drama series are distributed in the same time zone every day or every week in many cases. Therefore, even when there is a shift of a distribution starting time or a distribution ending time of a program among the series of programs, either the starting time or the ending time generally falls within the usual distribution time zone. As a result, according to the selecting device of the preferred aspect of the present invention, it is made possible to surely select the program which satisfies the predetermined correlation between itself and the designated program.

Further, in the selecting device of the present invention, it is preferable that the storage device stores each of the programs in association with a program name, and the searching section preferably searches for a program in association with a program name which at least partially coincides with the program name of the program designated by the designating section.

A series of programs such as a drama series usually have the same program name. Therefore, it is possible to improve searching accuracy by searching for the programs based on the program name.

Additionally, in the selecting device of the present invention, it is a preferable aspect that the selecting device includes a display section which displays a list of the programs stored in the storage device, and that the designating section designates a program in the list displayed on the display section.

By displaying the list of the programs, a user can easily recognize what kinds of programs are recorded, and can thereby easily designate a desired program.

Moreover, in the selecting device of the present invention, it is a preferable aspect that the storage device stores each program in association with a distribution date and time when the program is distributed, and that the selecting device includes a display section which displays a three-dimensional space formed by axes respectively of a time, a day of the week and a week, and which displays an icon representing a program stored in the storage device, in a position corresponding to the distribution date and time in the three-dimensional space. Moreover, it is a preferable aspect that the designating section designates a program by designating one of the icons, and that the selecting section reflects a result of selection on the display of the icons in the three-dimensional space in terms of the collectively selected programs.

In a preferred aspect of the selecting device of the present invention, the icons representing the programs and the like distributed at the same hour, are displaced side by side in a straight line in the three-dimensional space. Therefore, it is possible to select the programs accurately by not selecting a program which is arranged off the straight line although selected or by adding, to the selection, a program which is arranged in the straight line but not selected.

In a selecting method of the present invention, the selecting method includes: a designating step in which a program is designated from programs stored in a storage device in response to an operation; a searching step in which the programs stored in the storage device are searched for a program satisfying a predetermined correlation between itself and the program designated by the designating section; and a selecting step in which the program designated by the designating section and the program searched out by the searching section are collectively selected.

The selecting method of the present invention makes it possible to surely and easily select a drama series and the like even when a large number of programs are recorded.

In addition, in the selecting method of the present invention, it is preferable that the storage device stores each program in association with a distribution time zone when the program is distributed, and that the searching step is a step of searching for a program which is distributed in a distribution time zone overlapping the distribution time zone when the program designated by the designating section is distributed.

By searching for the program having the overlapping distribution time zone, the program satisfying the predetermined correlation between itself and the designated program is surely selected.

Moreover, in the selecting method of the present invention, it is preferable that the storage device stores each program in association with a program name, and that the searching step is a step of searching for a program associated with a program name which at least partially coincides with the program name of the program designated by the designating section.

The preferred selecting method of the present invention makes it possible to collectively select the related programs associated with the program names which at least partially coincide with each other.

Herein, only the three basic aspects are described for the selecting method in order to simply avoid a duplicate explanation. It should be noted that the selecting method of the present invention includes not only these three basic aspects but also various other aspects corresponding to the respective aspects of the selecting device as described above.

A selecting program storage medium of the present invention, stores a selecting program executed in a computer. The selecting program constructs a designating section which designates a program from programs stored in a storage device in response to an operation, a searching section which searches the programs stored in the storage device for a program satisfying a predetermined correlation between itself and the program designated by the designating section, and a selecting section which collectively selects the program designated by the designating section and the program searched out by the searching section.

The selecting program of the present invention makes it possible to collectively select mutually correlated programs easily.

In addition, in the selecting program storage medium of the present invention, it is preferable that the storage device stores each program in association with a distribution time zone when the program is distributed, and that the searching section searches for a program which is distributed in a distribution time zone overlapping the distribution time zone when the program designated by the designating section is distributed.

The selecting program storage medium of the present invention makes it possible to surely designate a desired program.

Herein, only the two basic aspects are described for the selecting program storage medium in order to simply avoid a duplicate explanation. It should be noted that the selecting program storage medium of the present invention includes not only these basic aspects but also various other aspects corresponding to the respective aspects of the selecting device as described above.

In addition, the constituents such as the designating section are constructed in the computer system by the selecting program storage medium of the present invention. Here, each of the constituents may be constructed by use of a single program component. Otherwise, more than one of the constituents may be constructed by use of a single program component. Moreover, these constituents may be constructed to execute the operations by themselves, or by issuing instructions to other programs or other program components incorporated in the computer system.

The present invention makes it possible to surely and easily select programs of a drama series and the like, even when a large number of programs are recorded.

DETAILED DESCRIPTION OF THE INVENTION

Hereinafter, an embodiment of the present invention will be described below with reference to the accompanying drawings.

Figure 1:
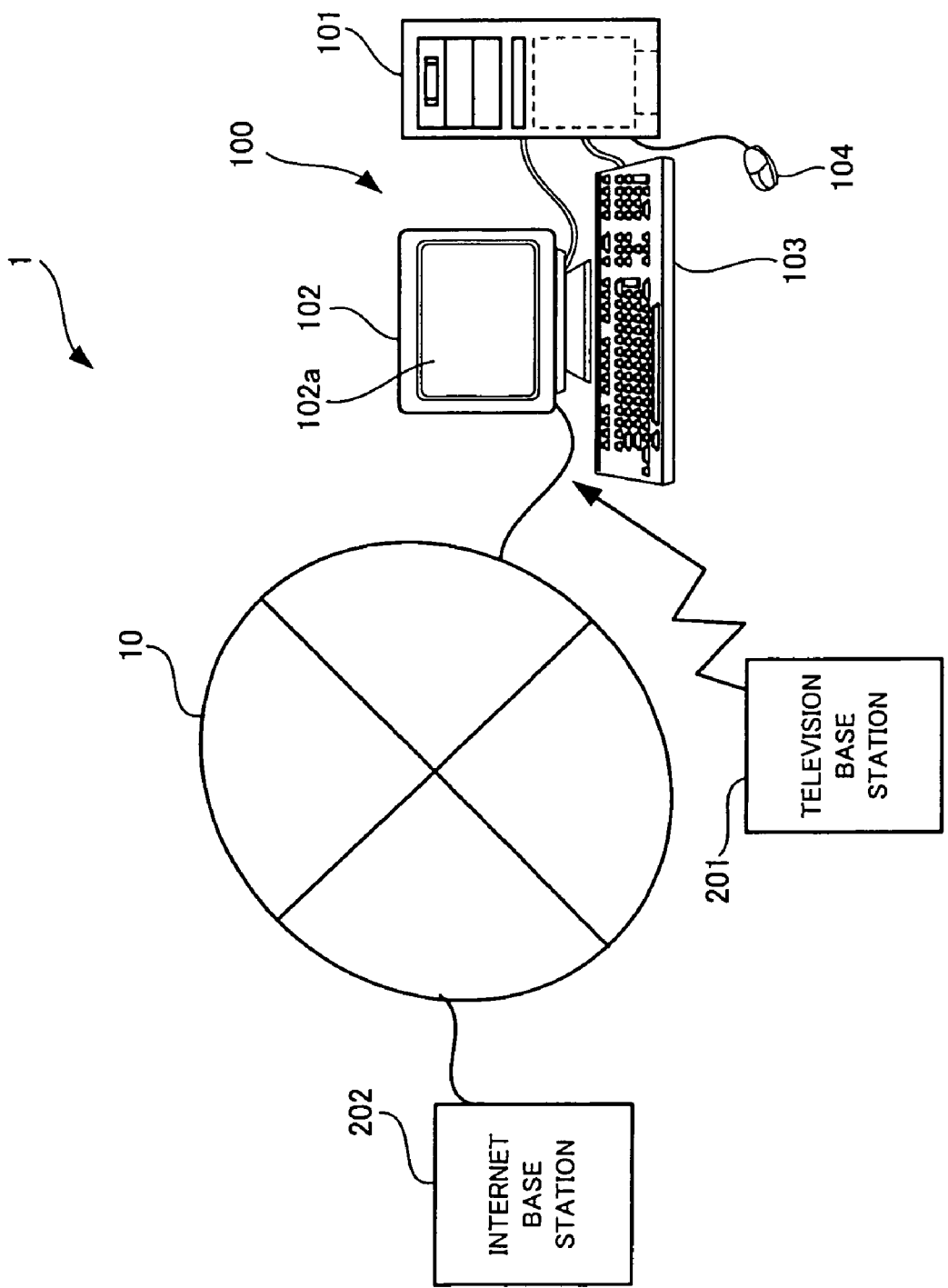
FIG. 1 is a schematic block diagram of a program distribution system to which an embodiment of the present invention is applied.

FIG. 1 is a schematic block diagram of a program distribution system to which an embodiment of the present invention is applied.

This program distribution system 1 includes a television base station 201 and an Internet base station 202, both of which distribute programs, and a personal computer 100 which receives the programs distributed by the television base station 201 and the Internet base station 202. Note that, in reality, numerous base stations, numerous personal computers, and the like are connected to the broadcast distribution system 1. However, FIG. 1 illustrates only the essential constituents for the description of the present invention.

The television base station 201 distributes television programs by use of television waves of a channel allocated to the base station thereof.

The Internet base station 202 distributes programs dedicated to the Internet through an Internet connection 10.

In the personal computer 100, includes an antenna as well as a television tuner (see FIG. 2) for receiving the programs distributed by the television base station 201, and an input interface for receiving the programs distributed by the Internet base station 202. The personal computer 100 receives the programs distributed by the television base station 201 and the Internet base station 202, and displays or records the received programs in accordance with operations by a user. This personal computer 100 represents an embodiment of a selecting device of the present invention. In the following, this personal computer 100 will be described in more detail.

In the external configuration, the personal computer 100 includes a main body 101, an image display device 102 which displays an image on a display screen 102a in response to an instruction from the main body 101, a keyboard 103 used for inputting, to the main body 101, various information corresponding to key operations, and a mouse 104 used for designating an arbitrary position on the display screen 102a and thereby inputting an instruction corresponding to an object such as icon on the arbitrary position. Moreover, although it is not illustrated in the drawing, this main body 101 also includes a compact disk/digital versatile disk (CD/DVD) loading gate for loading a DVD or a CD-ROM, and a flexible disk (hereinafter abbreviated as FD) loading gate for loading a FD.

Figure 2:
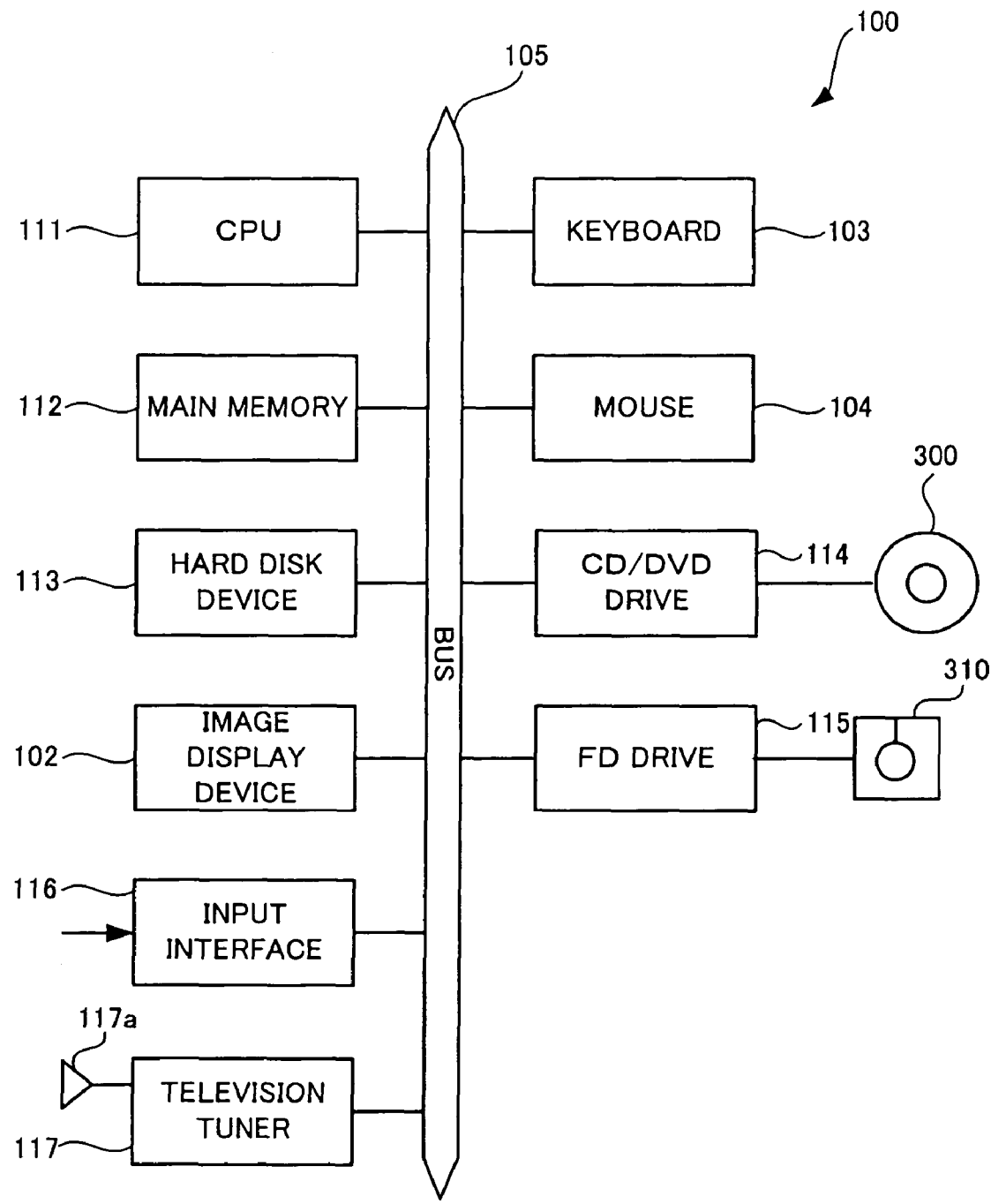
FIG. 2 is an internal block diagram of a personal computer.

FIG. 2 is an internal block diagram of the personal computer 100.

As shown in FIG. 2, the main body 101 includes a central processing unit (CPU) 111 which executes various programs, a main memory 112 which the programs stored in a hard disk device 113 are retrieved and expanded for execution by the CPU 111, the hard disk device 113 which saves the various programs, data, and the like, a CD/DVD drive 114 which loads and accesses a CD-ROM 300 or a DVD, an FD drive 115 which loads and accesses a FD 3101 an input interface 116 which receives the programs and program information from the Internet base station 202 shown in FIG. 1, an antenna 117a which receives television waves transmitted from the television base station 201 shown in FIG. 1 or the like, and a television tuner 117 which generates video signals based on the television waves received by the antenna 117a. As also shown in FIG. 2, the image display device 102, the keyboards 103, and the mouse 104 as well as these constituents are connected to one another through a bus 105.

Here, the embodiment of a selecting program storage medium of the present invention is applied to the CD-ROM 300 in which a recording-playback program is stored. The CD-ROM 300 is loaded in the CD/DVD drive 114, whereby a recording-playback program stored in the CD-ROM 300 is uploaded to this personal computer 100 and stored in the hard disk device 113. Then, this recording-playback program is started and executed, and thereby a recording-playback device 500 (see FIG. 4), to which the embodiment of the selecting device according to the present invention is applied, is constructed in the personal computer 100.

Next, the recording-playback program to be executed in this personal computer 100 will be described.

Figure 3:
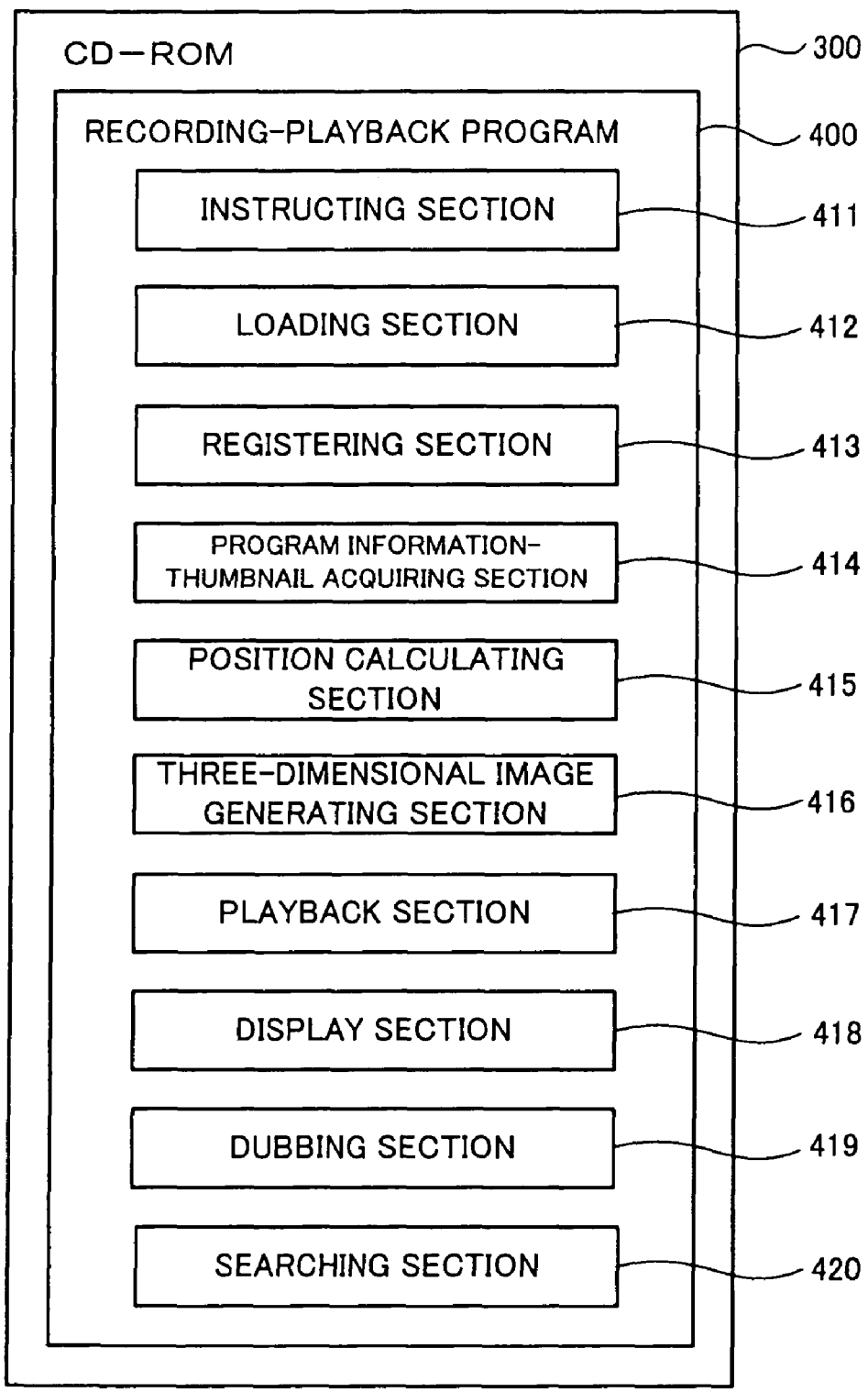
FIG. 3 is a conceptual diagram showing a recording-playback program stored in a CD-ROM.

FIG. 3 is a conceptual diagram showing the CD-ROM 300 storing the recording-playback program to be executed by this personal computer 100.

The recording-playback program 400 includes an instructing section 411, a loading section 412, a registering section 413, a program information-thumbnail acquiring section 414, a position calculating section 415, a three-dimensional image generating section 416, a playback section 417, a display section 418, a dubbing section 419, a searching section 420, and a collectively selecting section 421. Details of the sections of the recording-playback program 400 will be described later together with operations of the respective sections of the recording-playback device 500.

Note that, in FIG. 3, the CD-ROM 300 is illustrated as an example of the storage medium for storing the recording-playback program. However, the selecting program storage medium of the present invention is not limited only to the CD-ROM, and may be any other storage media such as an optical disk, a magneto-optical disk (MO), a FD or a magnetic tape.

Figure 4:
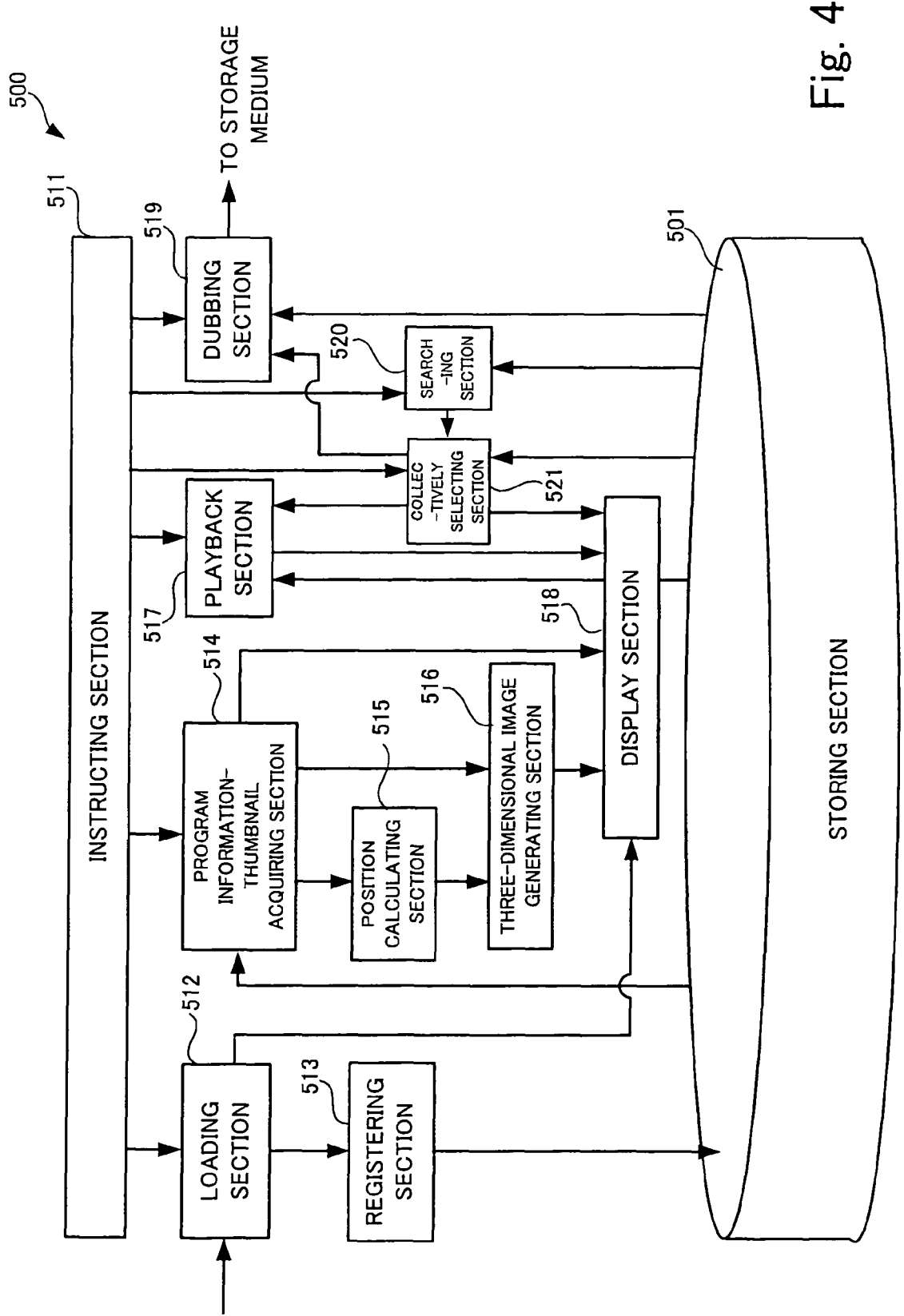
FIG. 4 is a functional block diagram of a recording-playback device.

FIG. 4 is a functional block diagram of the recording-playback device 500 constructed in the personal computer 100 after the recording-playback program 400 is installed in the personal computer 100 shown in FIG. 1.

The recording-playback device 500 shown in FIG. 4 includes an instructing section 511, a loading section 512, a registering section 513, a program information-thumbnail acquiring section 514, a position calculating section 515, a three-dimensional image generating section 516, a playback section 517, a display section 518, a dubbing section 519, a searching section 520, a collectively selecting section 521, and a storing section 501. When the recording-playback program 400 shown in FIG. 3 is installed in the personal computer 100 shown in FIG. 1, the instructing section 411 of the recording-playback program 400 constructs the instructing section 511 shown in FIG. 4. Likewise, the loading section 412 constructs the loading section 512, the registering section 413 constructs the registering section 513, the program information-thumbnail acquiring section 414 constructs the program information-thumbnail acquiring section 514, the position calculating section 415 constructs the position calculating section 515, the three-dimensional image generating section 416 constructs the three-dimensional image generating section 516, the playback section 417 constructs the playback section 517, the display section 418 constructs the display section 518, the dubbing section 419 constructs the dubbing section 519, the searching section 420 constructs the searching section 520, and the collectively selecting section 421 constructs the collectively selecting section 521.

A difference between the constituents in FIG. 4 and the constituents of the recording-playback program 400, shown in FIG. 3, is as follows. Each of the constituents in FIG. 4 are constructed of a combination of hardware of the computer with an operating program (OS) and application programs to be executed in the computer. By contrast, each of the constituents of the recording-playback program 400 in FIG. 3 is constructed solely of the application programs among the combination.

Hereinafter, each of the constituents of the recording-playback device 500 shown in FIG. 4 will be described, and thereby each of the constituents of the recording-playback program 400 shown in FIG. 3 is described at the same time.

The instructing section 511, a role of which the keyboard 103 and the mouse 104 shown in FIG. 1 play, transmits instructions, which is inputted by a user in accordance with various setting screens displayed on the display screen 102*a*, to the constituents respectively corresponding to the inputted instructions. The instructing section 511 corresponds to an example of a designating section of the present invention.

The television waves transmitted from the television base station 201 shown in FIG. 1 are received by the antenna 117*a* shown in FIG. 2. When the user issues an instruction to display or record a television program, the television waves of the channel designated by the instruction of the user are converted into program signals by the television tuner 117. When the user issues the instruction to display the television program, the loading section 512 acquires the program signals from the television tuner 117 and transfers the signals to the display section 518. When the user issues the instruction to record the television program, the loading section 512 digitalizes the program signals, and then transmitted them to the registering section 513. Meanwhile, when the user issues an instruction to display or record an Internet program, digital program data transmitted from the Internet base station 202 shown in FIG. 1 are received by the input interface shown in FIG. 2 and acquired by the loading section 512. When the user issues the instruction to display the Internet program, the loading section 512 transfers the program data thereof to the display section 518. When the user issues the instruction to record the Internet program, the loading section 512 transfers the program data thereof to the registering section 513. In the following, both of the analog broadcast signals and the digital broadcast signals will be collectively referred to as the programs.

The registering section 513 records the program transmitted from the loading section 512, and cut outs and then downsizes a scene in the program to generate a thumbnail image. In addition, the registering section 513 saves the recorded program in the storing section 501 together with the program information and the thumbnail image of the program.

The storing section 501, a role of which the hard disk device 113 shown in FIG. 2 plays, saves the recorded program in association with the program information distributed from the base station 201 or 202, and the thumbnail image obtained by cutting the scene out of the program. At this time, the hard disk device which actually saves the program may be located at a connecting point on another side of the network. The storing section 501 corresponds to an example of a storage device of the present invention.

The program information-thumbnail acquiring section 514 acquires the program information on the program and the thumbnail image saved in the storing section 501.

The position calculating section 515 calculates a position corresponding to a distribution date and time, a genre, and the like included in the program information acquired by the program information-thumbnail acquiring section 514 either in a three-dimensional space formed by axes respectively of a day of the week, a time, and a week (such a three-dimensional space will be hereinafter referred to as a basic three-dimensional space) or in a three-dimensional space formed by axes respectively of the day of the week, the genre, and the week (such a three-dimensional space will be hereinafter referred to as a new three-dimensional space).

The three-dimensional image generating section 516 generates a three-dimensional image by arranging the thumbnail image acquired by the program information-thumbnail acquiring section 514 in the position, which is calculated by the position calculating section 515, either in the basic three-dimensional space or in the new three-dimensional space.

The playback section 517 acquires, from the storing section 501, the program which the user instructs to playback, and transmits the acquired program to the display section 518.

The display section 518, a role of which the image display device 102 shown in FIG. 2 plays, includes both of a distal display function to display images based on digital program data and an analog display function to display images based on analog program signal. The display section 518 displays the analog program and the digital program transmitted from the loading section 512, the three-dimensional image generated by the three-dimensional image generating section 516, playback video images transmitted from the playback section 517, and the like on the display screen 102*a* shown in FIG. 1. The display section 518 corresponds to an example of a display section of the present invention.

The dubbing section 519, a role of which the CD/DVD drive 114 shown in FIG. 2 plays, acquires, from the storing section 501, the program which the user instruct to dub, and performs dubbing of the acquired program on a DVD. Moreover, this section may further include functions to work with the program saved in the storing section 501, such as a function to delete a selected program from the storing section 501.

When the user designates a program and inputs an instruction to collectively select a program related to the designated program, the searching section 520 searches the programs saved in the storing section 501 for the program related to the designated program. The searching method will be described later in detail. This searching section 520 corresponds to an example of a searching section of the present invention.

The selecting section 521 collectively selects the programs searched out by the searching section 520. The selecting section 521 corresponds to an example of a selecting section of the present invention.

The recording-playback device 500 is basically constructed as described above.

Subsequently, a series of processing for designating a program from the programs recorded and saved in the storing section 501 and for collectively selecting the program related to the designated program will be described.

When the desired program is designated from the recorded programs, the user firstly issues an instruction to display a list of the recorded programs saved in the storing section 501. An instruction screen for displaying the list of the recorded programs is prepared in advance in the recording-playback device 500. When the user inputs the instruction for displaying the list with the mouse 104 or the like, the content of the instruction is transmitted from the instructing section 511 to the program information-thumbnail acquiring section 514, shown in FIG. 4.

The program information-thumbnail acquiring section 514 acquires the program information and the thumbnail images saved in the storing section 501.

The following Table 1 shows various kinds of information saved in the storing section.

method for calculating the day of the week from the date has been widely known, the explanation will be omitted herein.

The hours are sequentially arranged on the Y axis starting from 23 o'clock, and then 22 o'clock, 21 o'clock, . . . , 1 o'clock, and 0 o'clock. The "time HH" in the distribution starting date and time (YYYY/MM/DD HH:PP) is acquired as a value on the Y axis.

The weeks are sequentially arranged on the Z axis starting from this week, and then last week, two weeks ago, and so forth. The week which is a value on the Z axis is calculated based on the date "YYYY/MM/DD" in the distribution starting date and time (YYYY/MM/DD HH:PP) and on today's date.

TABLE 1

| Recorded programs | Program information | | | | | |
|---|---|---|---|---|---|---|
| | Distribution starting date and time | Distribution ending date and time | Title of program | Genre | Distribution channel | Thumbnail image |
| TV1 | Oct. 31, 2005 08:15 | Oct. 31, 2005 08:30 | Morning drama | Drama | TV1 | TV1_Representative 1 |
| TV2 | Oct. 31, 2005 21:00 | Oct. 31, 2005 22:00 | Monday drama | Drama | TV8 | TV2_Representative 1 |
| TV3 | Nov. 01, 2005 08:15 | Nov. 01, 2005 08:30 | Morning drama | Drama | TV1 | TV3_Representative 1 |
| TV4 | Nov. 02, 2005 08:15 | Nov. 02, 2005 08:30 | Morning drama | Drama | TV1 | TV4_Representative 1 |
| TV5 | Nov. 03, 2005 08:15 | Nov. 03, 2005 08:30 | Morning drama | Drama | TV1 | TV5_Representative 1 |
| TV6 | Nov. 04, 2005 08:15 | Nov. 04, 2005 08:30 | Morning drama | Drama | TV1 | TV6_Representative 1 |
| Internet 1 | Nov. 05, 2005 23:00 | Nov. 05, 2005 23:30 | Evening news | News | Net 1 | NET1_Representative 1 |
| Internet 2 | Nov. 07, 2005 21:00 | Nov. 07, 2005 23:00 | Action movie | Movie | Net 2 | NET2_Representative 1 |

As shown in Table 1, the storing section 501 saves the recorded programs in association with the program information and the thumbnail images. In this embodiment, the program information is composed of a distribution starting date and time, a distribution ending date and time, a title of the program, a genre of the program (selected from movie, drama, variety, documentary, news, and educational), and a distribution channel.

The acquired program information is transmitted to the position calculating section 515, and the thumbnail image is transmitted to the three-dimensional image generating section 516.

The position calculating section 515 calculates a position corresponding to the distribution starting date and time, which is included in the program information transmitted from the program information-thumbnail acquiring section 514, in the basic three-dimensional space formed by the three axes of the time, the day of the week, and the week.

Figure 5:
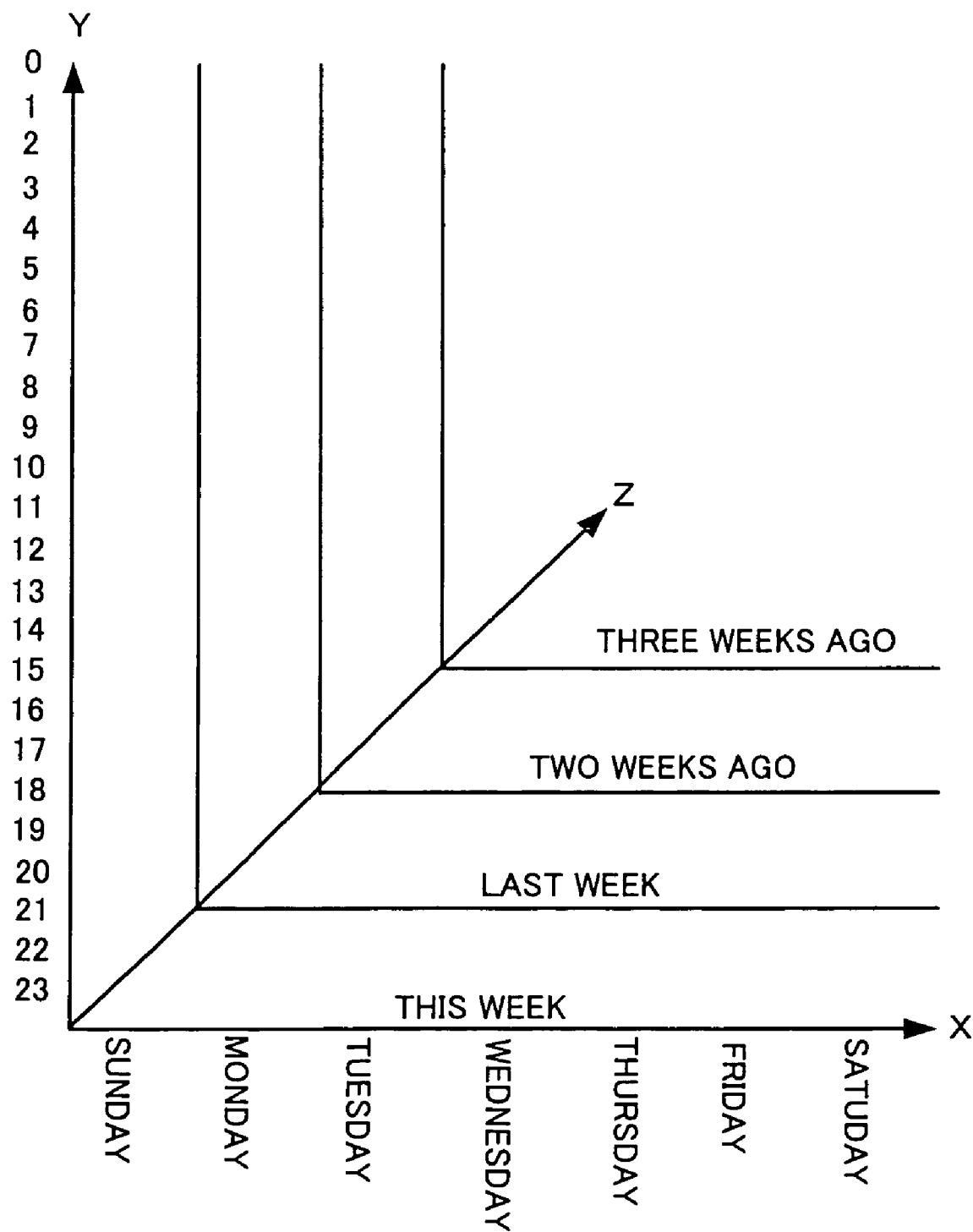
FIG. 5 is a conceptual diagram showing an example of a basic three-dimensional space.

FIG. 5 is a conceptual diagram showing an example of the basic three-dimensional space.

In this embodiment, the basic three-dimensional space with the day of the week on an X axis (in the lateral direction), the time on a Y axis (in the longitudinal direction), and the week on a Z axis (in the depth direction) is adopted.

The days are sequentially arranged on the X axis starting from Sunday, and then Monday, Tuesday, . . . , and Saturday. The day which is a value on the X axis is calculated based on the date "YYYY/MM/DD" in the distribution starting date and time (expressed as YYYY/MM/DD HH:PP). Since the The position in the basic three-dimensional space thus calculated is transmitted to the three-dimensional image generating section 516.

By the three-dimensional generating section 516, the thumbnail image transmitted from the program information-thumbnail acquiring section 514 is arranged in the position, which is transmitted from the position calculating section 515, in the basic three-dimensional space, and thereby the three-dimensional image is generated. The generated three-dimensional image is transmitted to the display section 518.

The display section 518 displays the three-dimensional image transmitted from the three-dimensional image generating section 516 on the display screen 102a.

Figure 6:
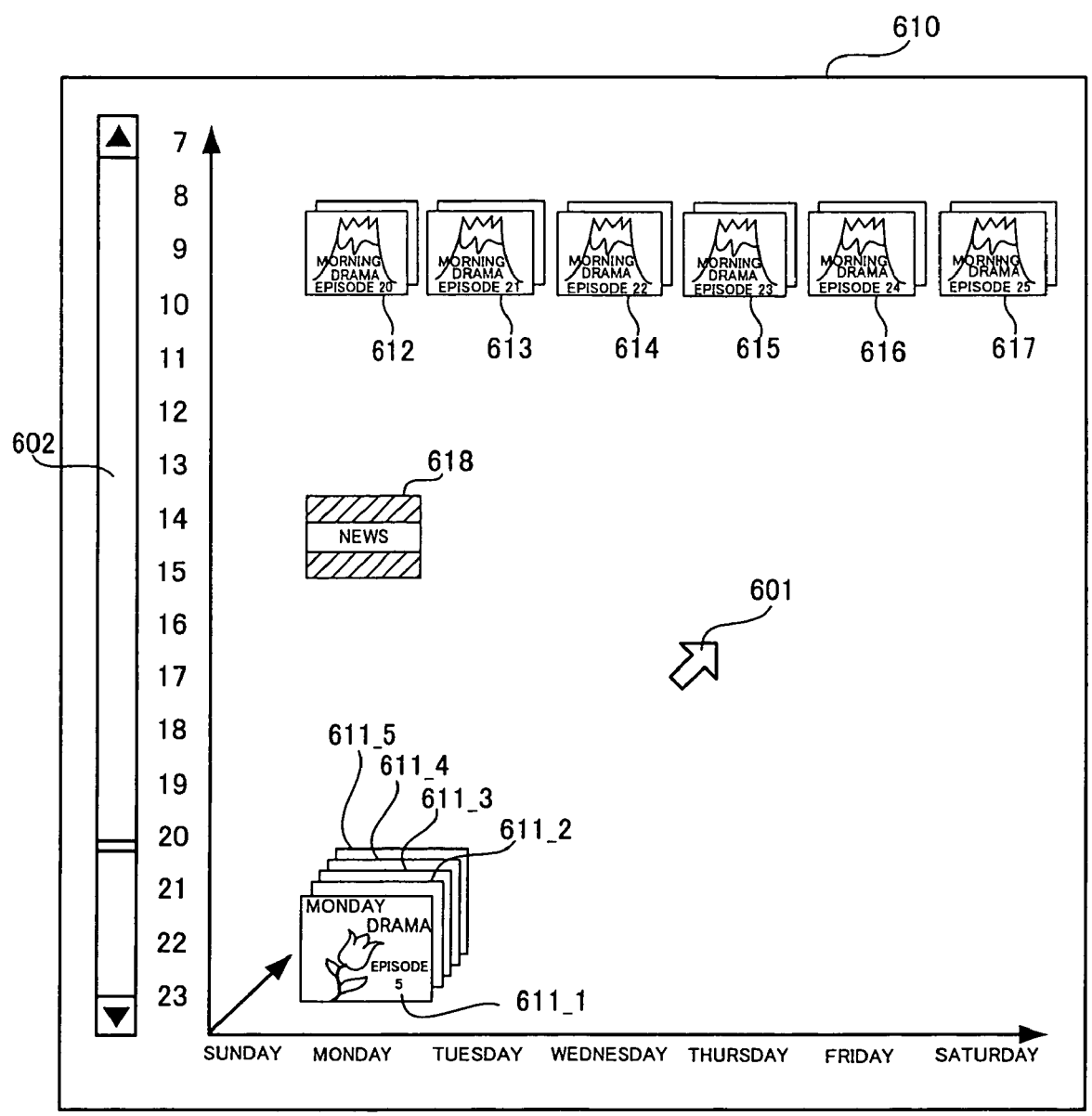
FIG. 6 is a view showing an example of a three-dimensional image displayed on a display screen.

FIG. 6 is a view showing an example of a three-dimensional image 610 displayed on the display screen 102a.

In the three-dimensional image 610 shown in FIG. 6, thumbnail images 612, 613, 614, 615, 616, and 617 of programs distributed every day at the same time are aligned and displayed in a straight line along the X axis (representing the day of the week). Meanwhile, thumbnail images 611_1, 611_2, 611_3, 611_4, and 611_5 of programs distributed every week on the same day and at the same time are aligned and displayed in a straight line along the Z axis. Moreover, a thumbnail image 618 of a program distributed at the time different from the times of other programs is displayed alone and independently from other thumbnail images.

In this way, according to the recording-playback device 500 of this embodiment, the thumbnail images of the programs distributed at the same time are aligned in a straight line in the three-dimensional image 610. Therefore, it is possible to visually check that those programs are related programs such as a drama series distributed at the same day every week or news programs distributed at the same time every morning. Nevertheless, when recording a drama series and the like collectively in a storage medium, for example, it is extremely troublesome to select the multiple thumbnail images aligned in the straight line in the three-dimensional image 610 one-by-one. Moreover, in some cases, there may be a change in the distributed time of an episode of a drama series and the like due to an extended live baseball program. Accordingly, when the thumbnail images aligned in the straight line is simply selected, there is a risk of selection failure and the like. According to the recording-playback device 500 of this embodiment, when one of the programs is designated, the program related to the designated program is automatically searched out, and the searched out program is selected collectively.

Figure 7:
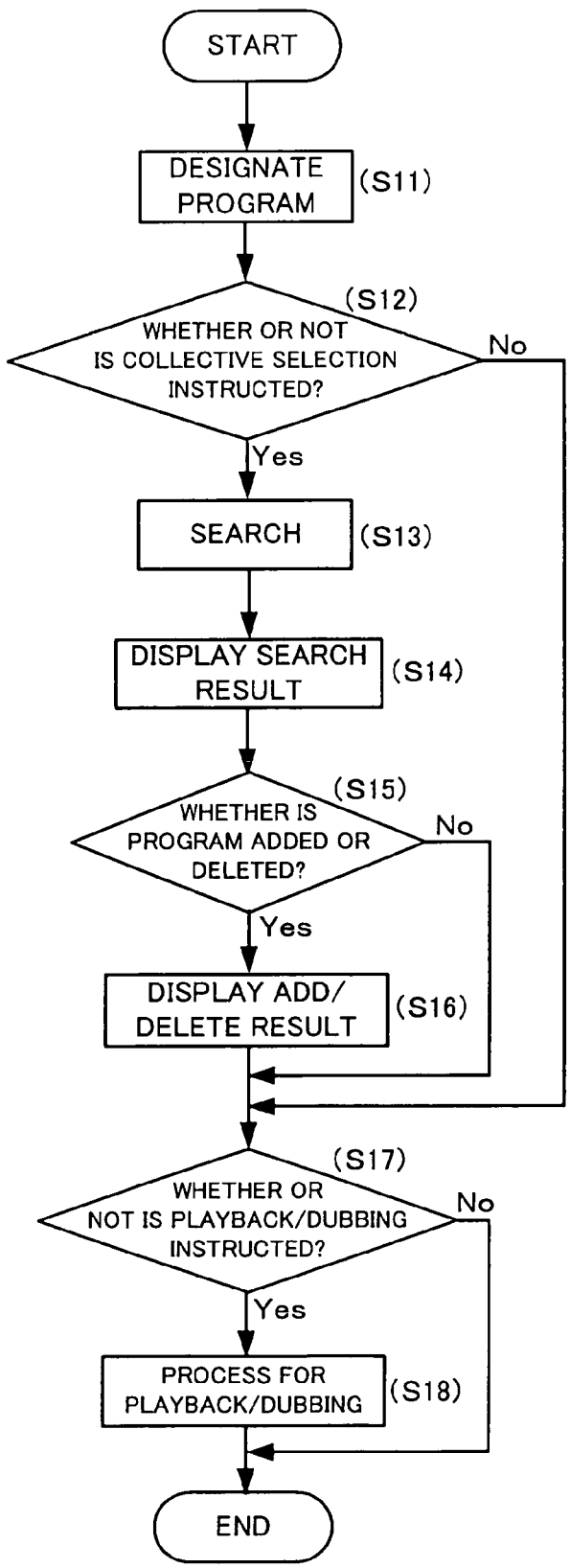
FIG. 7 is a flowchart showing a flow of a series of processing for designating a program and for collectively selecting a program related to the designated program.

FIG. 7 is a flowchart showing a flow of a series of processing for designating a program and selecting a program related to the designated program collectively.

When the user designates one of the thumbnail images from the multiple thumbnail imaged displayed in the three-dimensional image 610 shown in FIG. 6 by use of the mouse 104 (step S11 in FIG. 7) and clicks the right button of the mouse 104, a process selection pop-up window for selecting processes for the designated thumbnail image is displayed. The process of step S1 to designate one of the multiple thumbnail images corresponds to a designating process in the selecting method of the present invention.

Figure 8:
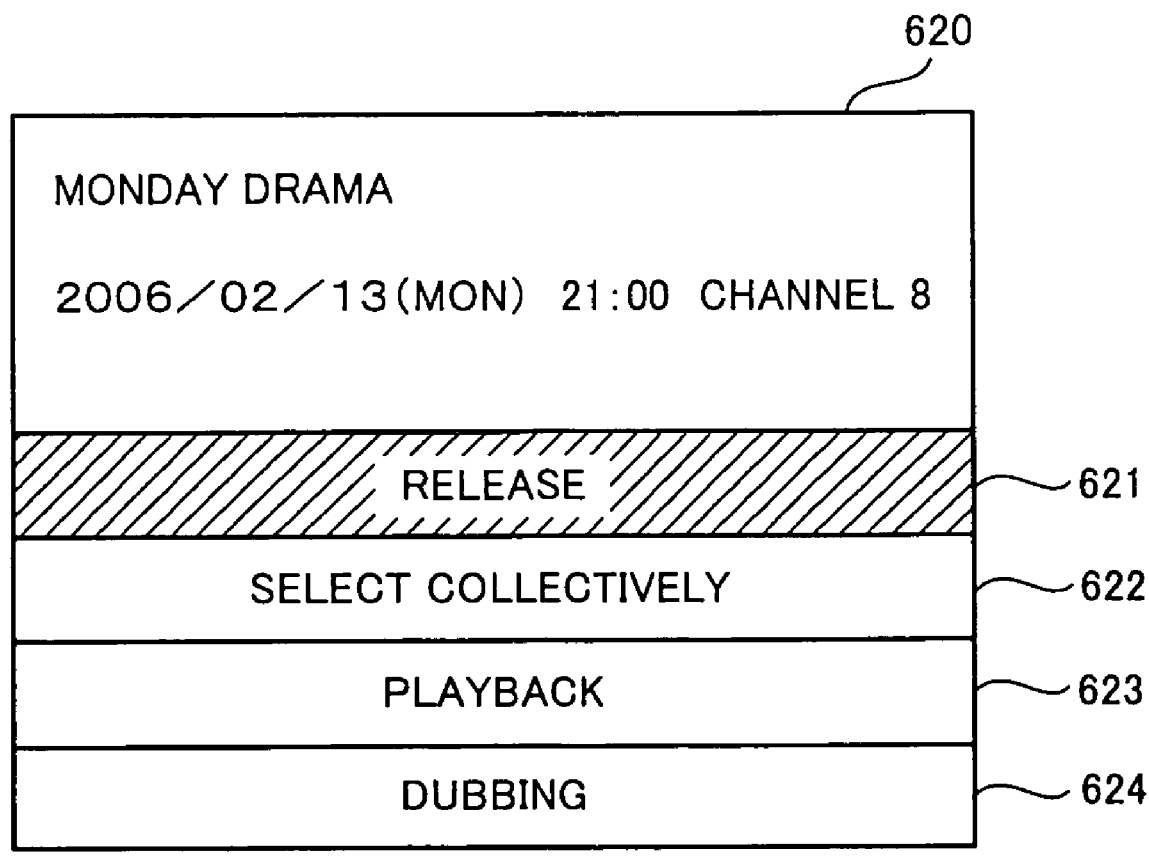
FIG. 8 is a view showing an example of a pop-up window for process selection.

FIG. 8 is a view showing an example of a process selection pop-up window 620.

In the process selection pop-up window 620, the program information concerning the program (a designated program) of the designated thumbnail image is displayed. The pop-up window 620 includes a release button 621 for canceling collective selection of the designated program and the related program; a select button 622 for collectively selecting the designated program and the related program; a playback button 623 for playing back the designated program; and a dubbing button 624 for dubbing the designated program in a storage medium. In this embodiment, at this moment, the release button 621 is displayed as a shaded area, because the program related to the designated program which is designated in step S11 is not collectively selected. When the user selects the select button 622 by use of the mouse 104 (step S12 in FIG. 7), the information on the designated program is transmitted from the instructing section 511 to the searching section 520, and a searching process is executed by the searching section 520 (step S13 in FIG. 7).

Here, the explanation on the flowchart shown in FIG. 7 will be interrupted for the time being, and the searching process will be described, instead.

Figure 9:
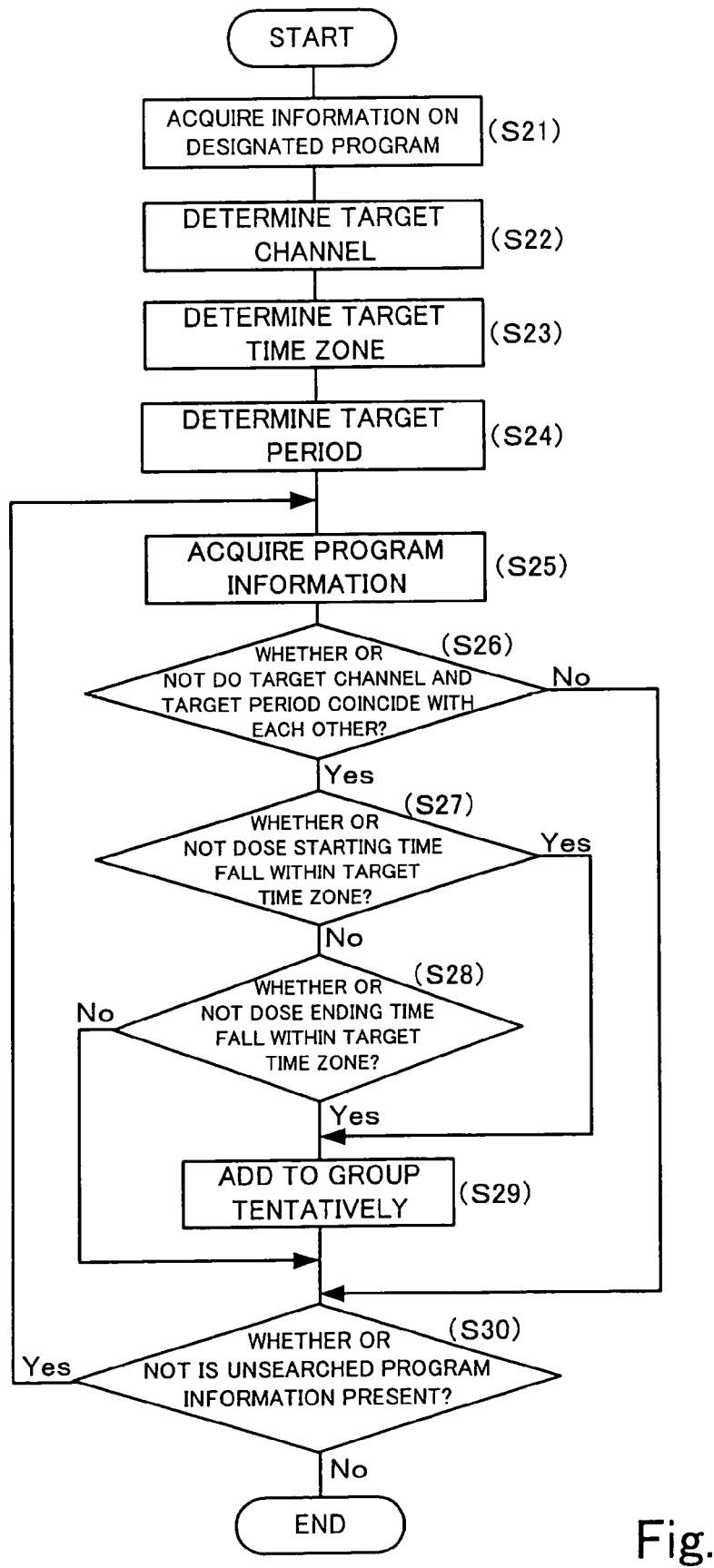
FIG. 9 is a flowchart showing a first process for searching for the program related to the designated program.

FIG. 9 is a flowchart showing a first process for searching for the program related to the designated program.

First, in the searching section 520, the program information on the designated program is acquired from the storing section 501 (step S21 in FIG. 9). In this embodiment, as shown in Table 1, there is acquired the program information composed of the distribution starting date and time, the distribution ending date and time, the title of the program, the genre of the program, and the distribution channel.

Subsequently, the distribution channel in the acquired program information is determined as a target channel which is one of search conditions (step S22 in FIG. 9); and a time zone between the distribution starting date and time and the distribution ending date and time is determined as a target time zone which is another search condition (step S23 in FIG. 9); and a target period which is the other search condition is determined based on the distribution date obtained from the distribution starting date and time (step S24 in FIG. 9). In this embodiment, as for the target period, a first period ranging from January to March, a second period ranging from April to June, a third period ranging from July to September, and a fourth period ranging from October to December are defined, so as to meet times of periodic program changes.

After determination of the search conditions, the searching section 520 acquires the program information on all the programs stored in the storing section 501, and determines sequentially whether or not any of the search target programs is a program related to the designated program.

Firstly, the program information on one of the target programs is acquired (step S25 in FIG. 9), and then it is determined whether or not the distribution channel of the target program coincides with the target channel, and whether or not the distribution period obtained from the distribution starting date and time coincides with the target period (step S26 in FIG. 9).

When the distribution channel coincides with the target channel and the distribution period coincides with the target period (step S26 in FIG. 26: Yes), it is determined whether or not the distribution date and time in the program information falls within the target time zone (step S27 in FIG. 9).

When the distribution starting date and time falls within the target time zone (step S27 in FIG. 9: Yes), the target program is determined as a candidate for the program related to the designated program, and is tentatively added to a relation group in which the programs related to the designated program are registered (step S29).

On the other hand, when the distribution starting date and time dose not fall within in the target time zone (step S27 in FIG. 9: No), it is determined whether or not the distribution ending date and time of the target program falls within the target time zone (step S28 in FIG. 9).

When the distribution ending date and time dose not fall within the target time zone (step S28 in FIG. 9: No), the target program is not determined as the candidate for the program related to the designated program. On the other hand, when the distribution ending date and time falls within in the target time zone (step S28 in FIG. 9: Yes), the target program is determined as the candidate for the program related to the designated program, and is added to the relation group (step S29 in FIG. 9).

This determination process is executed in terms of all the programs stored in the storing section 501 (step S30 in FIG. 9).

Figure 10:
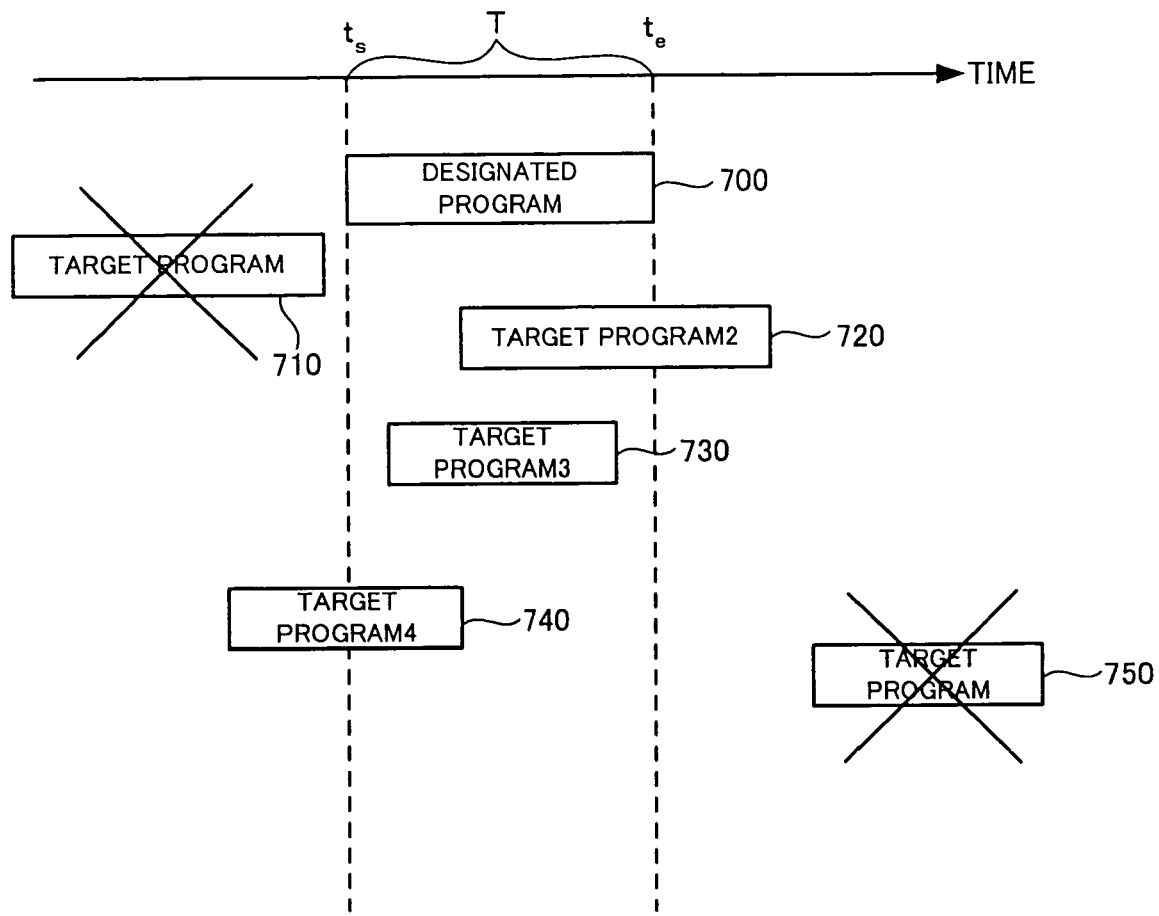
FIG. 10 is a conceptual diagram showing a determination result.

FIG. 10 is a conceptual diagram showing a determination result.

As a result of the determinations in accordance with the flowchart shown in FIG. 9, as shown in FIG. 10, a target program 730, a target program 720 a target program 740 are tentatively added to the relation group. Here, a time between the distribution starting date and time $t_s$ of a designated program 700 and the distribution ending date and time $t_e$ thereof is defined as a target time zone T. In the case of the target program 730, both the distribution starting date and time and the distribution ending date and time fall within in the target time zone T. In the case of the target program 720, only the distribution starting date and time falls within the target time zone T. In the case of the target program 740, only the distribution ending date and time falls within the target time zone T. However, neither the distribution starting dates and times nor distribution ending dates and times respectively of target programs 710 and 750 falls within the target time zone T, and thereby the target programs 710 and 750 are not added to the relation group. In this way, it is determined that the programs having the distribution time zone overlapping that of the designated program is the candidates for the related programs. This make it possible to surely select a program which has a distribution starting date and time or a distribution ending date and time, which are different from those of other usual programs in a case of a live broadcast time extension of a baseball game, or a program such as the first or last episode of a drama series In the state shown in FIG. 10, in the case where distribution of a desired program is cancelled and a special news program is distributed instead, for example, such a special news program is selected as the related program. Therefore, after the first process shown in FIG. 9, the searching section 520 performs a second process for the candidate programs which are tentatively added to the relation group.

Figure 11:
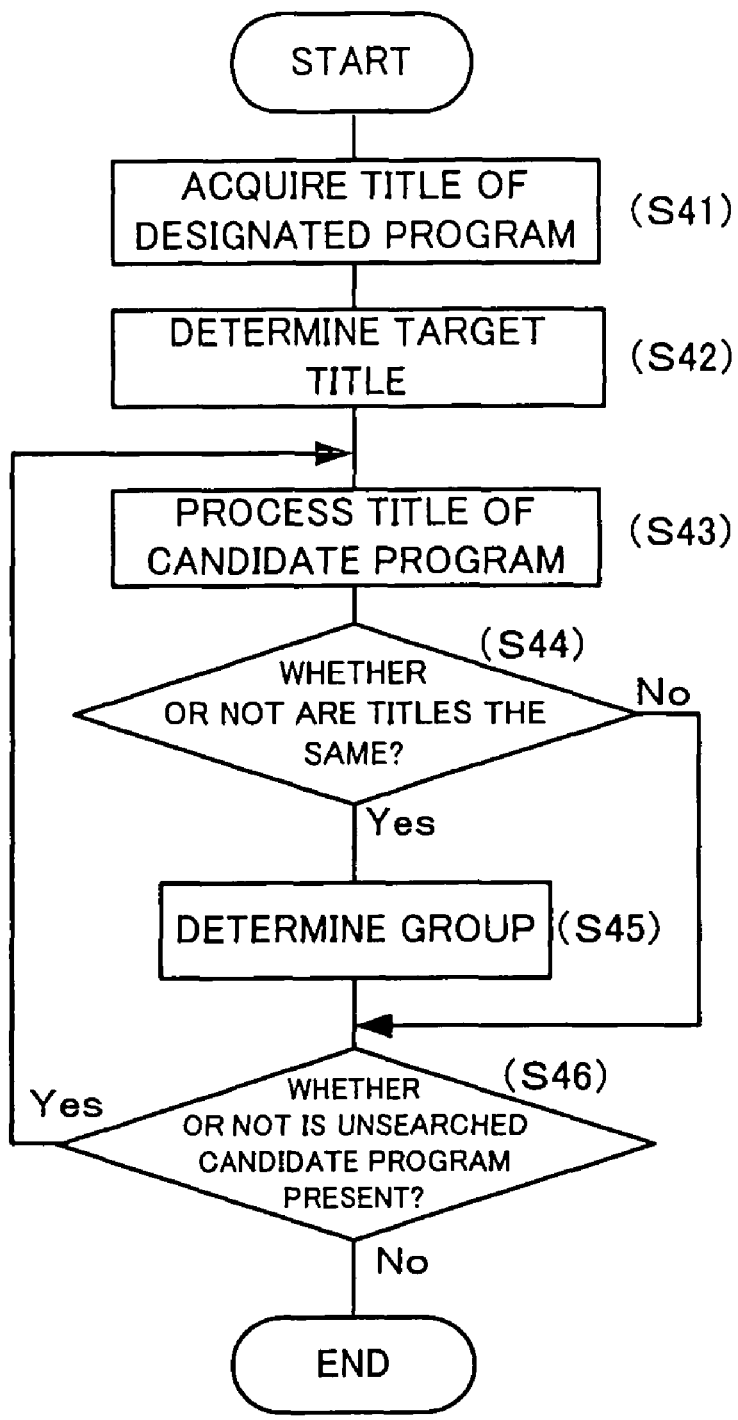
FIG. 11 is a flowchart showing a second process for searching for the program related to the designated program.

FIG. 11 is a flowchart showing a second process for searching for the program related to the designated program.

In the second process, the title of the program included in the program information on the designated program is acquired to begin with (step S41 in FIG. 11).

Subsequently, a target title which is a search condition is generated based on the acquired title of the program (step S42 in FIG. 11). The title of the program also includes candidates of character strings other than a program name, and the candidates are registered in the storing section 501 in advance. In this embodiment, character strings such as "stereo broadcasting", "bilingual broadcasting", and "teletext broadcasting" are registered. The searching section 520 deletes the character strings registered in the storing section 501 from the character strings of the acquired title of the program and thereby generates the target title.

After generating the target title, a determination process is executed sequentially for the candidate programs which are tentatively added to the relation group in the first process shown in FIG. 9.

First, the program title of the candidate program is acquired. Then, as similar to step S42, the registered character strings are deleted from the character string of the program title. Thereby, a tentative title is generated (step S43 in FIG. 11).

Subsequently, it is determined whether or not the target title generated in step S42 coincides with the tentative title generated in step S43 (step S44 in FIG. 11). When the target title coincides with the tentative title (step S44: Yes in FIG. 11), the candidate program is determined as a program related to the designated program and is registered in the relation group (step S45 in FIG. 11). When the target title does not coincide with the tentative title (step S44: No in FIG. 11), the candidate program is not determined as a program related to the designated program, and is deleted from the relation group.

The above determination process is executed for all the candidate programs. The program registered in the relation group by the process shown in FIG. 11 is determined as the related program related to the designated program designated in step S11 of FIG. 7. The process in step S12 for searching for the related program related to the designated program shown in FIG. 7 corresponds to an example of a searching step in the selecting method of the present invention.

Here, the description will return to FIG. 7.

In step S13, the information on the related programs searched out in accordance with FIG. 9 and FIG. 11 is transmitted from the searching section 520 to the collectively selecting section 521. From all the thumbnail images saved in the storing section 501, the collectively selecting section 521 acquires the thumbnail images of the related programs informed by the searching section 520. Then, the collectively selecting section 521 transmits the acquired thumbnail images to the display section 518.

In the three-dimensional image 610 displayed on the display screen 102a, the display section 518 displays a list of the thumbnail images transmitted from the collectively selecting section 521 (step S14 in FIG. 7). The process of step S14 for displaying the list of the thumbnail images corresponds to an example of a displaying step in the selecting method of the present invention.

Figure 12:
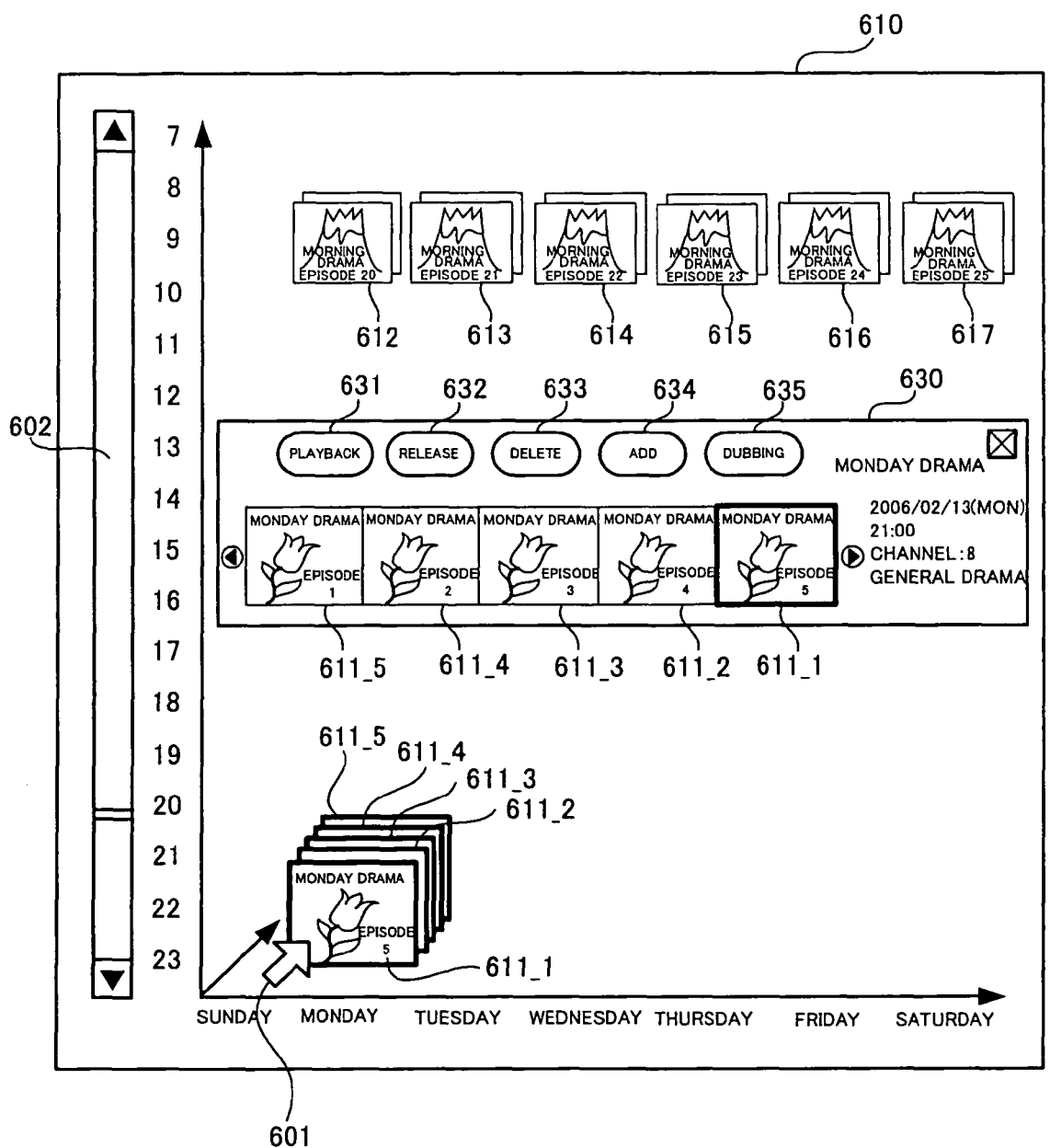
FIG. 12 is a view showing an example of a search result pop-up window in which thumbnail images of searched-out programs are arranged.

FIG. 12 is a view showing an example of a search result pop-up window in which the thumbnail images of the searched-out programs are arranged.

As shown in FIG. 12, thumbnail images 611_1, 611_2, 611_3, 611_4, and 611_5 of the searched-out related programs are highlighted in the three-dimensional image 610. Moreover, a search result pop-up window 630 is displayed in the three-dimensional image 610. The highlighted thumbnail images 611_1, 611_2, 611_3, 611_4, and 611_5 are displayed side by side in the search result pop-up window 630. The program information on the designated program designated in step S11 is also displayed therein. Moreover, the search result pop-up window 630 includes a continuous playback button 631 for continuously playing back the searched-out related programs, a release button 632 for releasing the collective selection of the searched-out related programs, a delete button 633 for deleting a related program from the relation group, the related program being selected from the searched-out related programs, an add button 634 for adding a program to the relation group, a collective dubbing button 635 for dubbing the searched-out related programs collectively in a storage medium, and the like.

When from the thumbnail images displayed in the search result pop-up window 630, the user selects, by use of a pointer 601, a thumbnail image of a related program which the user wishes to delete from the relation group, and presses the delete button 633 (step S15: Yes in FIG. 7), the information on the selected related program is transmitted to the collectively selecting section 521. Accordingly, an instruction to delete the selected related program from the relation group is transmitted from the collectively selecting section 521 to the display section 518. The display section 518 deletes the thumbnail image of the selected related program from the search result pop-up window 630 in accordance with the instruction transmitted from the collectively selecting section 521 (step S16 in FIG. 7).

In addition, when from the multiple thumbnail images displayed in the three-dimensional image 610, the user selects, by used of the pointer 601, a thumbnail image of a program which the user wishes to add to the relation group, and presses the add button 634, the information on the selected program is transmitted to the collectively selecting section 521. Accordingly, an instruction to add the selected program to the relation group is sent from the collectively selecting section 521 to the display section 518. The display section 518 adds the thumbnail image of the selected program to the search result pop-up window 630 in accordance with the instruction transmitted from the collectively selecting section 521.

Moreover, when the continuous playback button 631 is selected (step S17 in FIG. 7), the information on the related programs included in the relation group is transmitted from the collectively selecting section 521 to the playback section 517. In the playback section 517, the related programs informed by the collectively selecting section 521 is acquired from the storing section 501, and the acquired related programs are sequentially transmitted to the display section 518. Thereby, the related programs are displayed on the display screen 102a (step S18 in FIG. 7).

Furthermore, when the collective dubbing button 635 is selected (step S17 in FIG. 7), the information on the related programs included in the relation group is transmitted from the collectively selecting section 521 to the dubbing section 519. In the dubbing section 519, the related programs informed by the collectively selecting section 521 is acquired from the storing section 501. Accordingly, through the CD/DVD drive 114 shown in FIG. 2, the acquired related programs are saved in a DVD (not shown) loaded in the personal computer 100 instead of the CD-ROM 300 (step S18 in FIG. 7).

The process of step S17 in FIG. 7 for collectively selecting the programs in the relation group corresponds to a selecting step in the selecting method of the present invention.

As described above, according to the present invention, it is possible to select a drama series and the like surely and easily even when a number of programs are recorded.

Although the embodiment has been described with reference to the example of applying the personal computer to the selecting device, it is also possible to apply a television set and the like to the selecting device of the present invention.

Moreover, although the embodiment has been described with reference to the example of showing the list of the programs in a three-dimensional form, the display section of the present invention may also be configured to display the list of the programs in a two-dimensional form.

Further, the embodiment has been described with reference to the example of searching for the program based on a combination of the distribution time zone and on the program name. Instead, the selecting device of the present invention may also be configured to search for the program based on a single condition.

What is claimed is:

1. A selecting device comprising:
   a designating section which designates a program from programs distributed and stored in a storage device in response to an operation, each of the programs being stored in the storage device in association with a distribution date and time when the programs are distributed;
   a searching section which searches the programs stored in the storage device for a program satisfying a predetermined correlation between itself and the program designated by the designating section;
   a selecting section which collectively selects the program designated by the designating section and the program searched out by the searching section; and
   a display section which displays a three-dimensional space formed by axes respectively of a time, a day of the week and a week, and which displays icons representing programs stored in the storage device in a position corresponding to the distribution date and time in the three-dimensional space,
   the designating section designates a program by designating one of the icons,
   the selecting section reflects a selection result on the display of the icons in the three-dimensional space in terms of the collectively selected programs, and
   the display section displays each of the icons in the three-dimensional space in such manner as being arranged on a same axis in the three-dimensional space and being viewable at a time, each of the icons corresponding to programs selected by the selecting section and being the same of at least two among the time, the day of the week and the week in association with the programs.

2. The selecting device according to claim 1, wherein
   the storage device stores each program in association with a distribution time zone when the program is distributed, and
   the searching section searches for a program which is distributed in a distribution time zone overlapping the distribution time zone when the program designated by the designating section is distributed.

3. The selecting device according to claim 1, wherein
   the storage device stores each program in association with a program name thereof, and
   the searching section searches for a program associated with the program name which at least partially coincides with the program name associated with the program designated by the designating section.

4. The selecting device according to claim 1, further comprising:
   a display section which displays a list of the programs stored in the storage device,
   wherein the designating section designates a program in the list displayed on the display section.

5. A selecting method comprising:
   designating a program from programs distributed and stored in a storage device in response to an operation, each of the programs being stored in the storage device in association with a distribution date and time when the programs are distributed;
   searching the programs stored in the storage device for a program satisfying a predetermined correlation between itself and the program designated by the designating;
   collectively-selecting including collectively selecting the program designated by the designating and the program searched out by the searching; and
   displaying a three-dimensional space formed by axes respectively of a time, a day of the week and a week, and which displays icons representing programs stored in the storage device in a position corresponding to the distribution date and time in the three-dimensional space,
   the designating is designating a program by designating one of the icons,
   the selecting reflects a selection result on the display of the icons in the three-dimensional space in terms of the collectively selected programs, and
   the displaying displays each of the icons in the three-dimensional space in such manner as being arranged on the same axis in the three-dimensional space and being viewable at a time, each of the icons corresponding to programs selected by the selecting section and being the same of at least two among the time, the day of the week and the week in association with the programs.

6. The selecting method according to claim 5, wherein
   the storage device stores each program in association with a distribution time zone when the program is distributed, and
   the searching comprises searching for a program which is distributed in a distribution time zone overlapping the distribution time zone when the program designated by the designating is distributed.

7. The selecting method according to claim 5, wherein
   the storage device stores each program in association with a program name thereof, and
   the searching comprises searching for a program associated with a program name which at least partially coincides with the program name associated with the program designated in the designating.

8. A non-transitory selecting program storage medium storing a selecting program that is executed in a computer, the selecting program storage medium storing the selecting program that constructs:

- a designating section which designates a program from programs stored in a storage device in response to an operation, each of the programs being stored in the storage device in association with a distribution date and time when the programs are distributed;
- a searching section which searches the programs stored in the storage device for a program satisfying a predetermined correlation between itself and the program designated by the designating section;
- a selecting section which collectively selects the program designated by the designating section and the program searched out by the searching section; and
- a display section which displays a three-dimensional space formed by axes respectively of a time, a day of the week and a week, and which displays icons representing programs stored in the storage device in a position corresponding to the distribution date and time in the three-dimensional space,
- the designating section designates a program by designating one of the icons,
- the selecting section reflects a selection result on the display of the icons in the three-dimensional space in terms of the collectively selected programs, and
- the display section displays each of the icons in the three-dimensional space in such manner as being arranged on the same axis in the three-dimensional space and being viewable at a time, each of the icons corresponding to programs selected by the selecting section and being the same of at least two among the time, the day of the week and the week in association with the programs.

9. The selecting program storage medium according to claim 8, wherein the storage device stores each program in association with a distribution time zone when the program is distributed, and
- the searching section searches for a program which is distributed in a distribution time zone overlapping the distribution time zone when the program designated by the designating section is distributed.

10. The selecting device according to claim 1, further comprising:
- a window display section that displays, when the program is selected by the selecting section, a window in which process designating operators each of which designates a process for the selected program are arranged, in the three-dimensional space.

11. The selecting method according to claim 5, further comprising:
- window-displaying including displaying, when the program is selected by the selecting section collectively-selecting, a window in which process designating operators each of which designates a process for the selected program are arranged, in the three-dimensional space.

12. The selecting program storage medium according to claim 8, further comprising:
- a window display section that displays, when the program is selected by the selecting section, a window in which process designating operators each of which designates a process for the selected program are arranged, in the three-dimensional space.

* * * * *